United States Patent
Gill

(10) Patent No.: US 6,728,078 B2
(45) Date of Patent: Apr. 27, 2004

(54) HIGH RESISTANCE DUAL ANTIPARALLEL (AP) PINNED SPIN VALVE SENSOR

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 324 days.

(21) Appl. No.: 09/886,575

(22) Filed: Jun. 20, 2001

(65) Prior Publication Data

US 2002/0196588 A1 Dec. 26, 2002

(51) Int. Cl.$^7$ .............................................. G11B 5/127
(52) U.S. Cl. ...................................................... 360/314
(58) Field of Search ............................ 360/314, 324.1, 360/324.11, 324.12, 317; 324/252; 428/332

(56) References Cited

U.S. PATENT DOCUMENTS

| | | | |
|---|---|---|---|
| 5,492,720 A | 2/1996 | Gill et al. ..................... 427/131 |
| 5,508,866 A | 4/1996 | Gill et al. ..................... 360/113 |
| 5,715,120 A | 2/1998 | Gill ............................. 360/113 |
| 5,726,838 A | 3/1998 | Soeya et al. .................. 360/113 |
| 5,731,936 A | 3/1998 | Lee et al. ..................... 360/113 |
| 5,780,176 A | 7/1998 | Iwasaki et al. ............... 428/692 |
| 5,796,561 A | 8/1998 | Mauri .......................... 360/113 |
| 5,811,155 A | 9/1998 | Pinarbasi ..................... 427/131 |
| 5,812,350 A | 9/1998 | Chen et al. ................... 360/126 |
| 5,850,323 A | 12/1998 | Kanai ........................... 360/113 |
| 5,850,324 A | 12/1998 | Wu et al. ...................... 360/113 |
| 5,852,531 A | 12/1998 | Yamada ......................... 360/113 |
| 5,856,897 A | 1/1999 | Mauri .......................... 360/113 |
| 5,875,079 A | 2/1999 | Honda et al. ................. 360/113 |
| 5,896,252 A | 4/1999 | Kanai ........................... 360/113 |
| 5,910,868 A | 6/1999 | Kurosawa et al. ........... 360/113 |
| 5,923,505 A | 7/1999 | Kroes et al. .................. 360/113 |
| 6,046,891 A | 4/2000 | Yoda et al. ................... 360/113 |
| 6,219,210 B1 * | 4/2001 | Pinarbasi ................. 360/324.11 |
| 6,313,973 B1 * | 11/2001 | Fuke et al. ................ 360/324.1 |
| 6,338,899 B1 * | 1/2002 | Fukuzawa et al. ........... 428/332 |
| 6,490,140 B1 * | 12/2002 | Mao et al. ............... 360/324.11 |
| 6,556,390 B1 * | 4/2003 | Mao et al. ................ 360/324.1 |

* cited by examiner

Primary Examiner—Allen Cao
(74) Attorney, Agent, or Firm—Ervin F. Johnston

(57) ABSTRACT

A dual spin valve sensor has a ferromagnetic free layer which is located between nonmagnetic first and second spacer layers wherein the first and second spacer layers are located between ferromagnetic first and second AP pinned layer structures and wherein the first and second AP pinned layer structures are located between and are exchange coupled to antiferromagnetic first and second pinning layers. In one aspect of the invention the free layer is composed of cobalt iron nickel (CoFeNi) for raising the resistance of the sensor and in another aspect of the invention first and second AP pinned layers in each of the first and second AP pinned layer structures are composed of cobalt iron ($Co_{50}Fe_{50}$) for further raising the resistance of the sensor to the sense current. The increase in the resistance of the sensor to the sense current increases the output signal of the sensor.

21 Claims, 5 Drawing Sheets

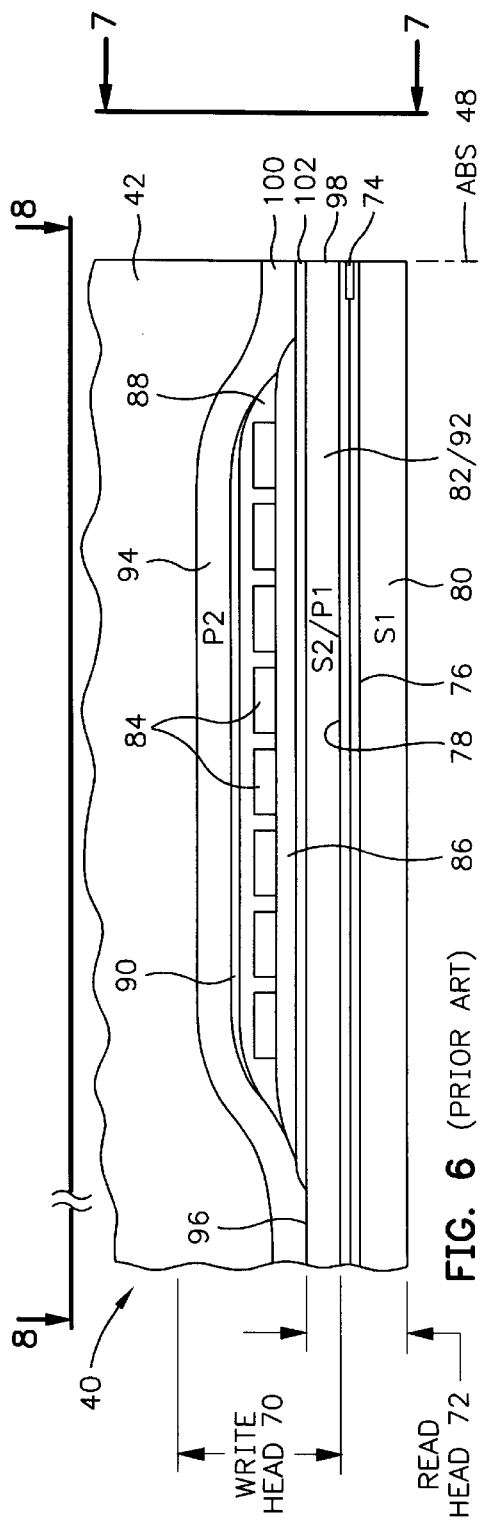
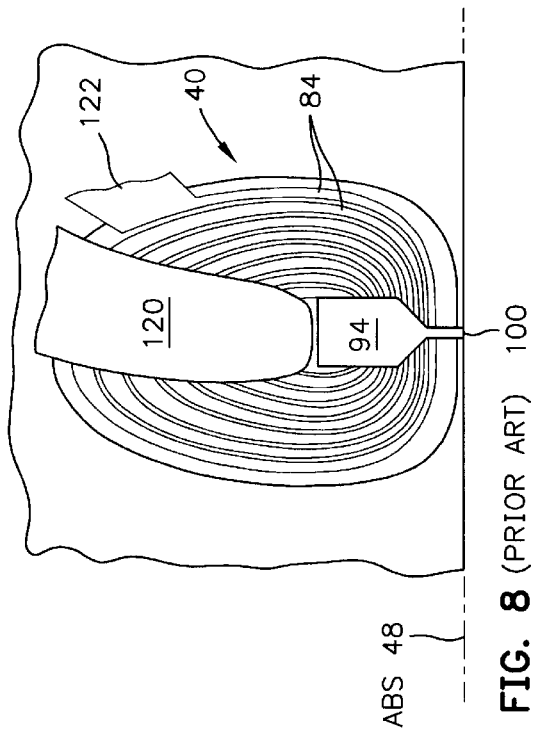
FIG. 6 (PRIOR ART)
FIG. 7 (PRIOR ART)
FIG. 8 (PRIOR ART)

FIG. 9 (ABS)

HIGH RESISTANCE DUAL ANTIPARALLEL (AP) PINNED SPIN VALVE SENSOR

BACKGROUND OF THE INVENTION

1. Field of the Invention

The present invention relates to a high resistance dual antiparallel (AP) pinned spin valve sensor and, more particularly, to such a spin valve sensor wherein various layers of the spin valve sensor have a high resistance for increasing the output signal of the sensor.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is parallel to the ABS, is the position of the magnetic moment of the free layer structure with the sense current conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

The dual spin valve sensor has a ferromagnetic free layer structure which is located between nonmagnetic first and second spacer layers. The first and second spacer layers are, in turn, located between first and second pinned layer structures and the first and second pinned layer structures are located between antiferromagnetic first and second pinning layers. The pinning layers pin magnetic moments of the first and second pinned layer structures. It has been found that the magnetoresistive coefficient dr/R of the dual spin valve sensor is about 50% greater than the magnetoresistive coefficient dr/R of a single spin valve sensor. Unfortunately, the sheet resistance of the dual spin valve sensor to the sense current $I_S$ is less than the sheet resistance of the single spin valve sensor which seriously reduces the output signal of the dual spin valve sensor. The output signal is essentially a product of the sheet resistance times the magnetoresistive coefficient dr/R.

The free layer structure in a dual spin valve sensor is typically a nickel iron layer which is located between first and second cobalt iron layers. It has been found that a cobalt iron free layer next to a spacer layer increases the magnetoresistive coefficient dr/R and that the nickel iron layer reduces the uniaxial anisotropy $H_K$ of the free layer structure so that it is more responsive to signal fields from the rotating magnetic disk. These free layers, however, reduce the sheet resistance of the dual sensor. Further, the nickel iron free layer is employed for reducing a positive magnetostriction of the free layer structure which is caused by the first and second cobalt iron free layers. After lapping the magnetic head to form the ABS, the head is in compression at the ABS which, in combination with the positive magnetostriction, urges the magnetic moment of the free layer structure perpendicular to the ABS. This causes the free layer structure to be unstable when it is repetitively subjected to signal fields from the rotating magnetic disk. Accordingly, the nickel iron is necessary to reduce positive magnetostriction so that the free layer structure will have improved stability. Further, it is desirable to make each of the pinned layer structures in the dual spin valve sensor an antiparallel (AP)

pinned layer structure which has an antiparallel coupling layer located between ferromagnetic first and second antiparallel (AP) pinned layers. An AP pinned layer structure is desired because of its thermal stability when subjected to heat in the presence of magnetic fields which urge the magnetic moments of the AP pinned layers from their pinned orientation. Because of partial flux closure between the first and second AP pinned layers of each AP pinned layer structure the exchange coupling field between the pinning layers and the AP pinned layer structures is significantly greater than the exchange coupling field between pinning layers and single pinned layer structures. Unfortunately, the three layers in each AP pinned layer structure shunt more of the sense current $I_S$ than single pinned layer structures which causes the dual spin valve sensor to have a lower sheet resistance.

SUMMARY OF THE INVENTION

The present invention provides a dual spin valve sensor which has a higher sheet resistance. The free layer structure in the present invention is a single free layer which is composed of cobalt iron nickel (CoFeNi). While the cobalt iron (CoFe) has a positive magnetostriction, the nickel (Ni) reduces the positive magnetostriction to zero, if desired. Further, the resistance of the free layer is significantly greater because nickel iron (NiFe) does not have to be added in order to reduce the positive magnetostriction. Because of the thinner cobalt iron nickel (CoFeNi) free layer the overall sheet resistance of the dual spin valve sensor is increased. Still further, I have discovered that the nickel maintains the free layer in a polycrystalline state. This polycrystalline state promotes polycrystalline structures for each of the layers fabricated on the cobalt iron nickel (CoFeNi) free layer. In a preferred embodiment, the cobalt iron nickel (CoFeNi) free layer is $Co_{70}Fe_{15}Ni_{15}$.

Another aspect of the invention is to increase the resistance of each of the first and second AP pinned layer structures. This is accomplished by making each of the first and second AP pinned layers of each of the first and second AP pinned layer structures of cobalt iron ($Co_{50}Fe_{50}$). This composition has 50% more moment than the typical AP pinned layers which are composed of cobalt iron ($Co_{90}Fe_{10}$). Since each cobalt iron ($Co_{50}Fe_{50}$) AP pinned layer has 50% more moment than a cobalt iron ($Co_{90}Fe_{10}$) AP pinned layer the cobalt iron ($Co_{50}Fe_{50}$) AP pinned layer can be 25% thinner than the cobalt iron ($Co_{90}Fe_{10}$) AP pinned layer. Because of this reduced thickness the resistance of each AP pinned layer in each of the first and second AP pinned layer structures is increased so as to increase the overall sheet resistance of the dual spin valve sensor.

An object of the present invention is to provide a high resistance dual antiparallel (AP) pinned spin valve sensor.

Another object is to provide a high resistance free layer and/or high resistance first and second antiparallel (AP) pinned layer structures for a dual pinned spin valve sensor.

A further object is to provide a method of making of the aforementioned spin valve sensors.

Other objects and attendant advantages of the invention will be appreciated upon reading the following description taken together with the accompanying drawings.

BRIEF DESCRIPTION OF THE DRAWINGS

FIG. 6 is a partial view of the slider and a merged magnetic head as seen in plane 6—6 of FIG. 2;

FIG. 7 is a partial ABS view of the slider taken along plane 7—7 of FIG. 6 to show the read and write elements of the merged magnetic head;

FIG. 8 is a view taken along plane 8—8 of FIG. 6 with all material above the coil layer and leads removed;

DESCRIPTION OF TILE PREFERRED EMBODIMENTS

Magnetic Disk Drive

Figure 1:
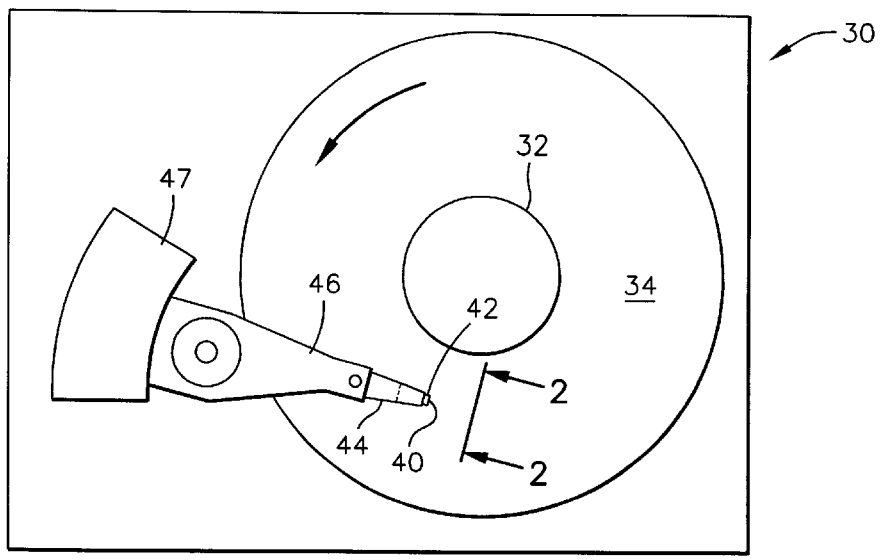
FIG. 1 is a plan view of an exemplary magnetic disk drive.
Figure 2:
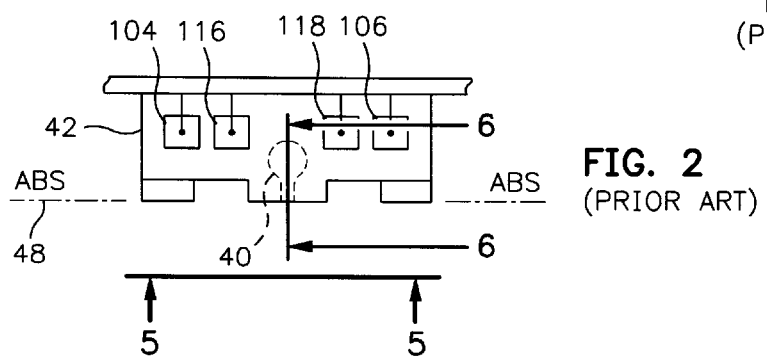
FIG. 2 is an end view of a slider with a magnetic head of the disk drive as seen in plane 2—2 of FIG. 1.
Figure 3:
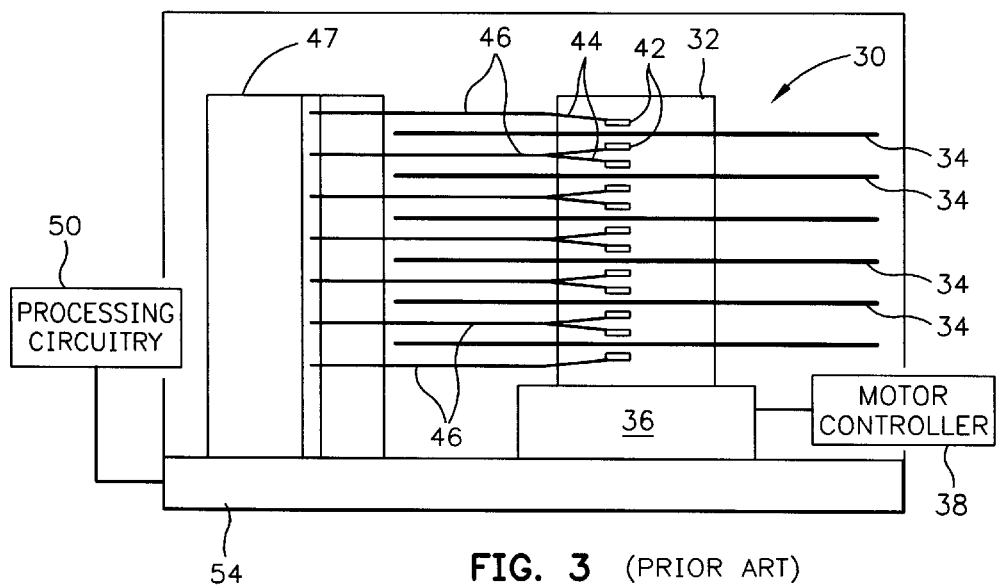
FIG. 3 is an elevation view of the magnetic disk drive wherein multiple disks and magnetic heads are employed.
Figure 4:
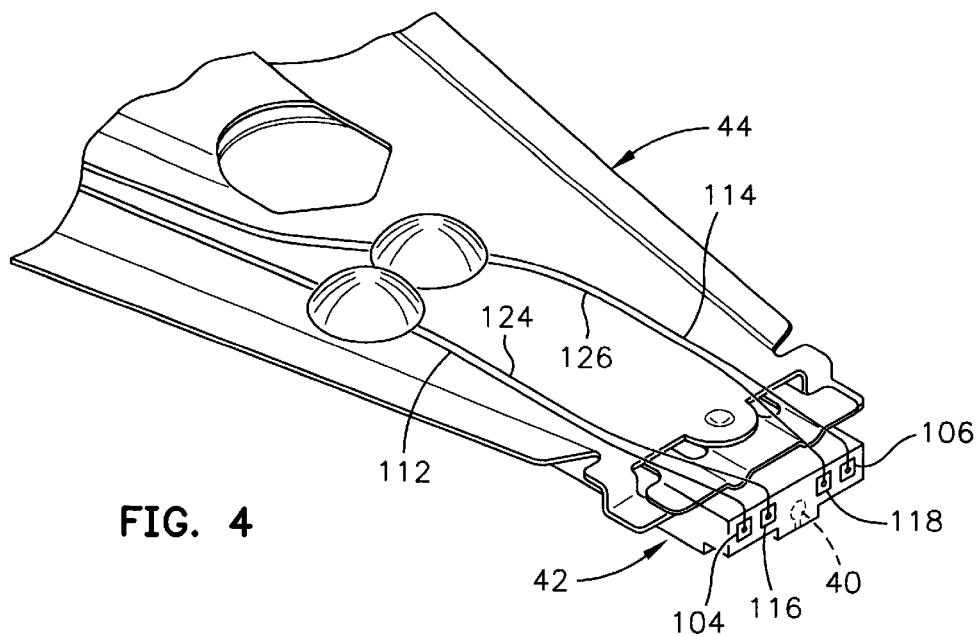
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
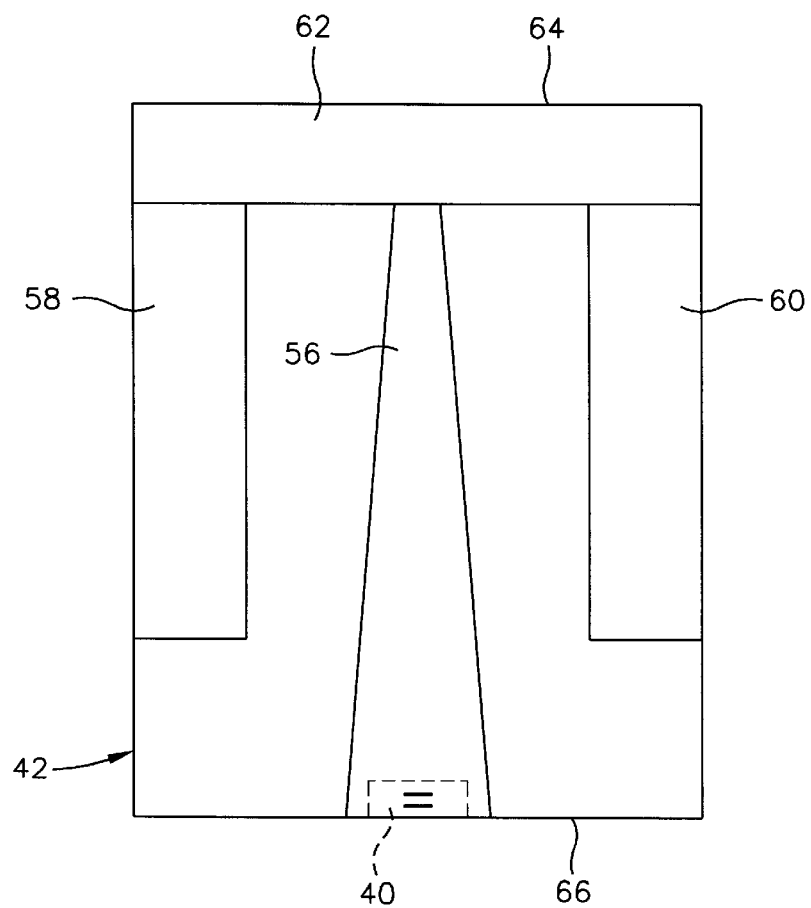
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a dual spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
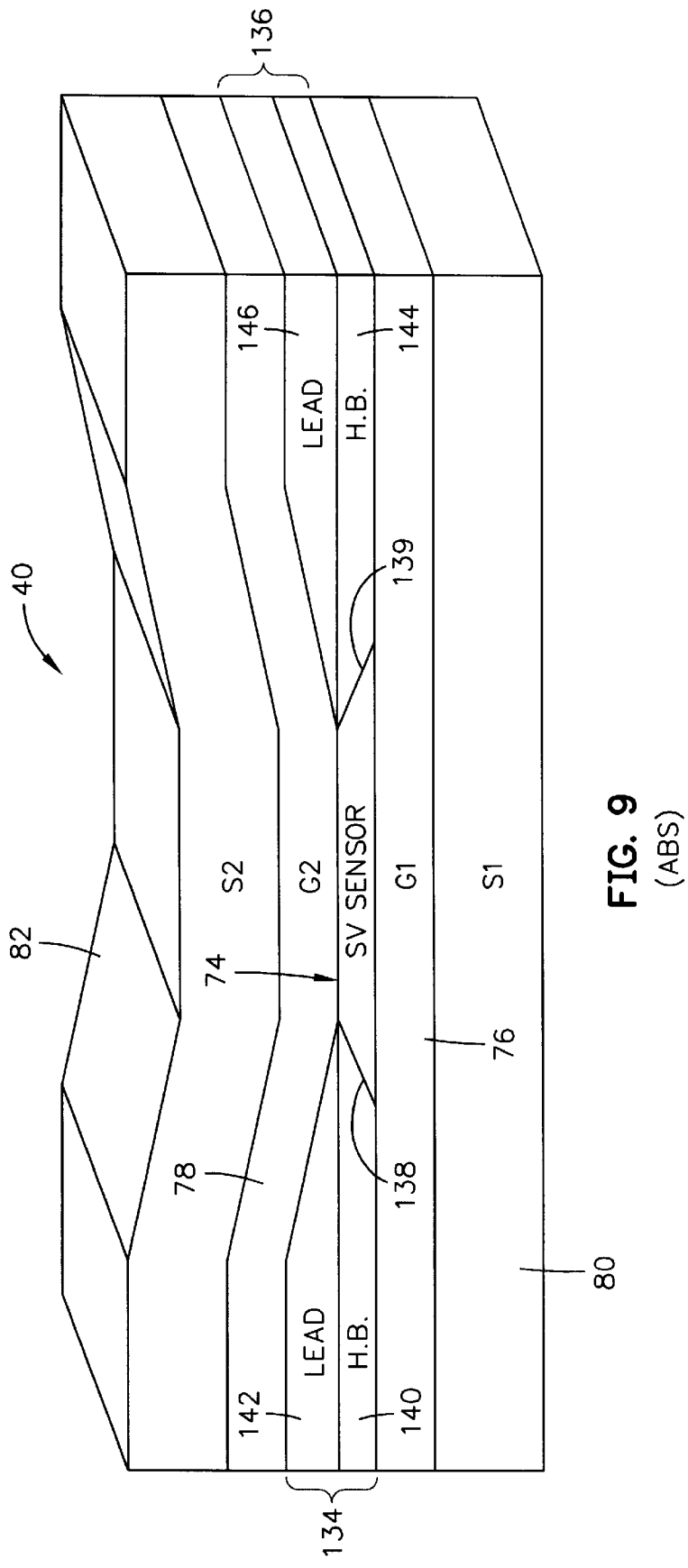
FIG. 9 is an enlarged isometric illustration of the read head with a spin valve sensor.

FIG. 9 is an isometric ABS illustration of the read head 40 shown in FIG. 6. The read head 40 includes the spin valve sensor 74. First and second hard bias and lead layers 134 and 136 are connected to first and second side edges 138 and 139 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

The Invention

Figure 10:
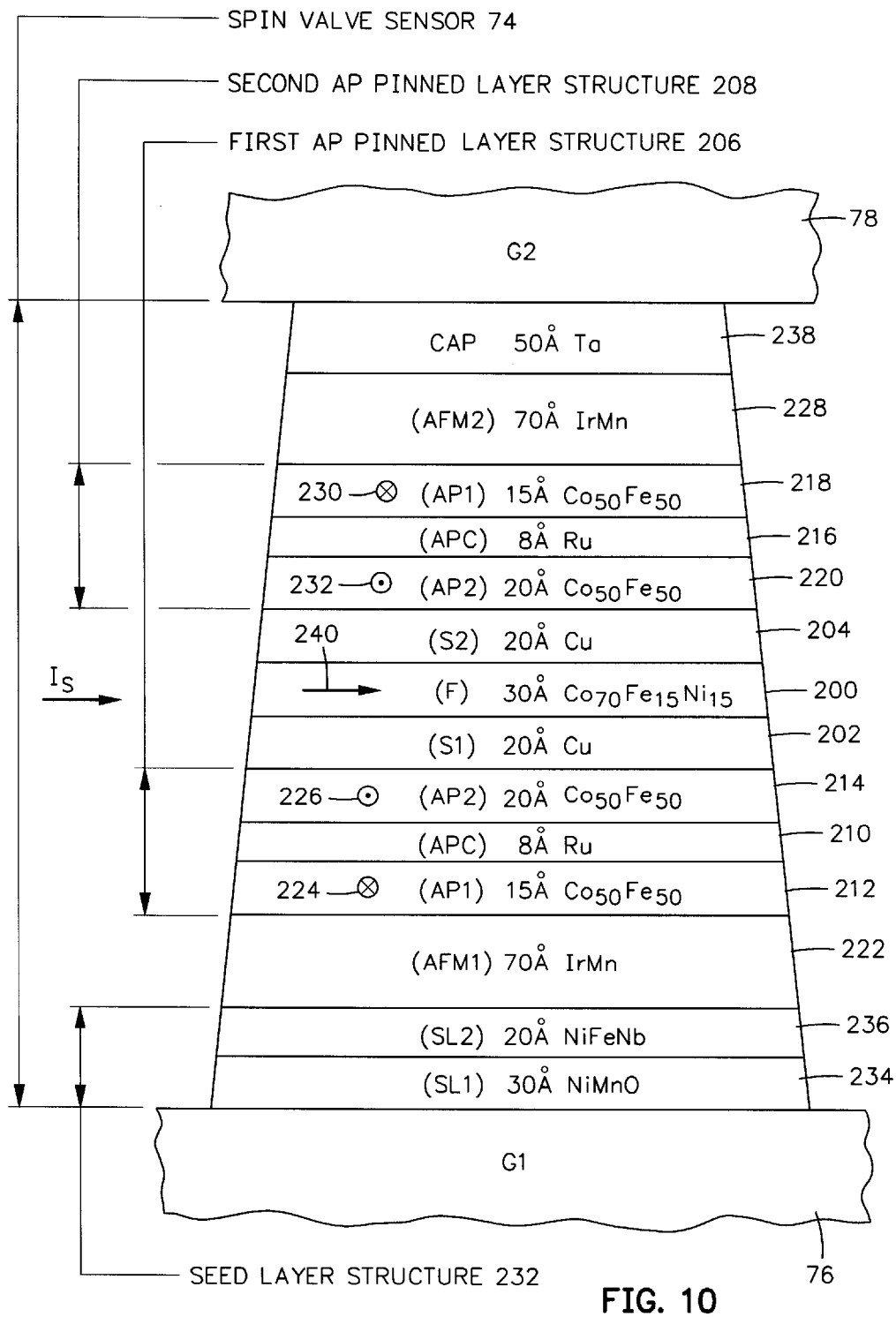
FIG. 10 is an enlarged ABS illustration of the spin valve sensor shown in FIG. 9.

FIG. 10 is an enlarged illustration of the present spin valve sensor 74 which is located between the first and second read gap layers 76 and 78. The spin valve sensor is a dual spin valve sensor which has a ferromagnetic free layer (F) 200 which is located between nonmagnetic first and second spacer layers (S1) and (S2) 202 and 204. The first and second spacer layers 202 and 204 are, in turn, located between first and second antiparallel (AP) pinned layer structures 206 and 208. The first AP pinned layer structure 206 includes an antiparallel coupling (APC) layer 210 which is located between first and second AP pinned layers (AP1) and (AP2) 212 and 214. The second antiparallel (AP) pinned layer structure 208 includes an antiparallel coupling (APC) layer 216 which is located between first and second AP pinned layers (AP1) and (AP2) 218 and 220.

The first AP pinned layer 212 is exchange coupled to an antiferromagnetic first pinning layer (AFM1) 222 which pins a magnetic moment 224 of the first AP pinned layer perpendicular to the ABS, either out of the sensor or into the sensor, as shown in FIG. 10. By strong antiparallel coupling between the first and second AP pinned layers 212 and 214 a magnetic moment 226 of the second AP pinned layer is pinned antiparallel to the magnetic moment 224. A first AP pinned layer 218 is exchange coupled to an antiferromagnetic second pinning layer (AFM2) 228 which pins a magnetic moment 230 of the first AP pinned layer perpendicular to the ABS out of the head or into the sensor, as shown in FIG. 10. By strong antiparallel coupling between the first and second AP pinned layers 218 and 220 a magnetic moment 232 of the second AP pinned layer is oriented antiparallel to the magnetic moment 230.

It is preferable to provide a seed layer structure 232 below the first pinning layer 222 which has first and second seed layers (SL1) and (SL2) 234 and 236. The seed layers 234 and 236 promote a desirable microstructure for the layers deposited thereon. Further, it is desirable to provide a cap layer 238 on the second pinning layer 228 to protect the spin valve sensor from subsequent processing steps.

One aspect of the invention is to provide a high resistance free layer 200. This is accomplished by making the free layer 200 of cobalt iron nickel (CoFeNi) which has a desirable magnetic softness, magnetostriction and polycrystalline structure for promoting the same type of structure in the layers deposited thereon. While the cobalt iron (CoFe) has a positive magnetostriction, the nickel (Ni) is combined for reducing the magnetostriction to zero, if desired. Since nickel iron (NiFe) is not required to reduce the magnetostriction the overall thickness of the free layer 200 can be reduced for increasing its resistance. This increase in resistance increases the sheet resistance of the spin valve sensor 74 to the sense current $I_S$ so that the output signal is increased. In a preferred embodiment, the free layer is composed of cobalt iron nickel ($Co_{70}Fe_{15}Ni_{15}$).

In another aspect of the invention the resistance of the first and second AP pinned layer structures 206 and 208 is increased. This is accomplished by increasing the resistance of each of the AP pinned layers 212, 214, 220 and 218. In a preferred embodiment, each of these pinned layers is composed of cobalt iron ($Co_{50}Fe_{50}$). Cobalt iron ($Co_{50}Fe_{50}$) has 50% more moment than typical cobalt iron ($Co_{90}Fe_{10}$). Accordingly, each of the AP pinned layers 212, 214, 220, 218 can be made 25% thinner than prior art AP pinned layers. Because of this reduced thickness the resistance of each AP pinned layer is increased to increase the overall resistance of the spin valve sensor to the sense current $I_S$. This then increases the output signal of the sensor. In the broader concept of this aspect the cobalt iron is $Co_{40-70}Fe_{60-30}$.

A magnetic moment 240 of the free layer 200 is oriented parallel to the ABS and to the major planes of the layers, either from right to left or from left to right, as shown in FIG. 10. When a field signal from the rotating magnetic disk rotates the magnetic moment 240 into the sensor the magnetic moment 240 becomes more antiparallel with respect to the magnetic moments 226 and 232, which increases the resistance of the sensor to the sense current $I_S$, and when the signal field from the rotating magnetic disk rotates the magnetic moment 240 of the free layer out of the sensor the magnetic moment 240 becomes more parallel with respect to the moments 226 and 232, which decreases the resistance of the sensor to the sense current $I_S$. These changes in resistance of the sensor are processed as playback signals by the processing circuitry 50 in FIG. 3.

Exemplary and preferred thicknesses of the layers are 30 Å of nickel manganese oxide (NiMnO) for the first seed layer 234, 20 Å of nickel iron niobium (NiFeNb) for the second seed layer 236, 70 Å of iridium manganese (IrMn) for the first pinning layer 222, 15 Å of cobalt iron ($Co_{50}Fe_{50}$) for the first AP pinned layer 212, 8 Å of ruthenium (Ru) for the antiparallel coupling layer 210, 20 Å of cobalt iron ($Co_{50}Fe_{50}$) for the second AP pinned layer 214, 20 Å of copper (Cu) for the first spacer layer 202, 30 Å of cobalt iron nickel ($Co_{70}Fe_{15}Ni_{15}$) for the free layer 200, 20 Å of copper (Cu) for the second spacer layer 204, 20 Å of cobalt iron ($Co_{50}Fe_{50}$) for the second AP pinned layer 220, 8 Å of ruthenium (Ru) for the antiparallel coupling layer 216, 15 Å of cobalt iron ($Co_{50}Fe_{50}$) for the first AP pinned layer 218, 70 Å of iridium manganese (IrMn) for the second pinning layer 228 and 50 Å of tantalum (Ta) for the cap layer 238.

Discussion

The invention also includes the method of making the dual spin valve sensor described hereinabove. It should be noted that the first and second pinning layers are significantly thinner than most pinning layers. This is because iridium manganese (IrMn) is employed which can be thin and still perform the required exchange coupling for pinning the pinned layer structure. Because of the thinner first and second pinning layers the resistance of the pinning layers is higher which still further increases the sheet resistance of the spin valve sensor. It should be understood that the concepts described hereinabove can also be used for a single spin valve sensor employing either a single pinned layer or an AP pinned layer structure.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
   a spin valve sensor including:
      nonmagnetic first and second spacer layers;
      a ferromagnetic free layer located between the first and second spacer layers;
      ferromagnetic first and second antiparallel (AP) pinned layer structures;
      the first and second spacer layers being located between the first and second AP pinned layer structures;
      antiferromagnetic first and second pinning layers;
      the first and second AP pinned layer structures being located between and interfacing the first and second pinning layers respectively;
      the free layer being composed of cobalt iron nickel ($Co_{70}Fe_{15}Ni_{15}$);
      each of the first and second AP pinned layer structures having ferromagnetic first and second antiparallel (AP) pinned layers and an antiparallel (A/P) coupling layer with the AP coupling layer located between the first and second AP pinned layers; and
      each of the first and second AP pinned layers of each of the first and second AP pinned layer structures being composed of cobalt iron ($Co_{40-70}Fe_{60-30}$).

2. A magnetic read head as claimed in claim 1 including:
   nonmagnetic electrically nonconductive first and second read gap layers;
   the spin valve sensor being located between the first and second read gap layers;
   ferromagnetic first and second shield layers; and
   the first and second read gap layers being located between the first and second shield layers.

3. A magnetic read head as claimed in claim 2 wherein each of the first and second AP pinned layers of each of the first and second AP pinned layer structures is composed of $Co_{50}Fe_{50}$.

4. A magnetic read head as claimed in claim 3 wherein each pinning layer is composed of iridium manganese (IrMn).

5. A magnetic read head which has an air bearing surface (ABS), comprising:
   a spin valve sensor including:
      nonmagnetic first and second spacer layers;
      a ferromagnetic free layer located between the first and second spacer layers;
      ferromagnetic first and second antiparallel (AP) pinned layer structures;
      the first and second spacer layers being located between the first and second AP pinned layer structures;
      antiferromagnetic first and second pinning layers;
      the first and second AP pinned layer structures being located between and interfacing the first and second pinning layers respectively;
      each of the first and second AP pinned layer structures having ferromagnetic first and second antiparallel (AP) pinned layers and an antiparallel (AP) coupling layer with the AP coupling layer located between the first and second AP pinned layers; and
      each of the first and second AP pinned layers of each of the first and second AP pinned layer structures being composed of cobalt iron ($Co_{40-70}Fe_{60-30}$).

6. A magnetic read head as claimed in claim 5 wherein each of the first and second AP pinned layers of each of the first and second AP pinned layer structures is composed of $Co_{50}Fe_{50}$.

7. A magnetic head assembly having an air bearing surface (ABS), comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head including:
      a spin valve sensor;
      nonmagnetic electrically nonconductive first and second read gap layers;
      the spin valve sensor being located between the first and second read gap layers;
      a ferromagnetic first shield layer; and
      the first and second gap layers being located between the first shield layer and the first pole piece layer; and
   the spin valve sensor including:
      nonmagnetic first and second spacer layers;
      a ferromagnetic free layer located between the first and second spacer layers;
      ferromagnetic first and second antiparallel (AP) pinned layer structures;
      the first and second spacer layers being located between the first and second AP pinned layer structures;

antiferromagnetic first and second pinning layers;

the first and second AP pinned layer structures being located between and interfacing the first and second pinning layers respectively;

the free layer being composed of cobalt iron nickel ($Co_{70}Fe_{15}Ni_{15}$);

each of the first and second AP pinned layer structures having ferromagnetic first and second antiparallel (AP) pinned layers and an antiparallel (AP) coupling layer with the AP coupling layer located between the first and second AP pinned layers; and each of the first and second AP pinned layers of each of the first and second AP pinned layer structures being composed of cobalt iron ($Co_{40-70}Fe_{60-30}$).

8. A magnetic head assembly as claimed in claim 7 wherein each of the first and second AP pinned layers of each of the first and second AP pinned layer structures is composed of $Co_{50}Fe_{50}$.

9. A magnetic head assembly as claimed in claim 8 wherein each pinning layer is composed of iridium manganese (IrMn).

10. A magnetic disk drive including at least one magnetic head assembly that has an air bearing surface (ABS) and that includes a write head and a read head, comprising:

a write head including:
  ferromagnetic first and second pole piece layers that have a yoke portion located between a pole tip portion and a back gap portion;
  a nonmagnetic write gap layer located between the pole tip portions of the first and second pole piece layers;
  an insulation stack with at least one coil layer embedded therein located between the yoke portions of the first and second pole piece layers; and
  the first and second pole piece layers being connected at their back gap portions; and a read head including:
  a spin valve sensor;
  nonmagnetic electrically nonconductive first and second read gap layers;
  the spin valve sensor being located between the first and second read gap layers;
  a ferromagnetic first shield layer; and
  the first and second read gap layers being located between the first shield layer and the first pole piece layer; and the spin valve sensor including:
  nonmagnetic first and second spacer layers;
  a ferromagnetic free layer located between the first and second spacer layers;
  ferromagnetic first and second antiparallel (AP) pinned layer structures;
  the first and second spacer layers being located between the first and second AP pinned layer structures;
  antiferromagnetic first and second pinning layers;
  the first and second AP pinned layer structures being located between and interfacing the first and second pinning layers respectively;
  the free layer being composed of cobalt iron nickel ($Co_{70}Fe_{15}Ni_{15}$);
  each of the first and second AP pinned layer structures having ferromagnetic first and second antiparallel (AP) pinned layers and an antiparallel (AR) coupling layer with the AP coupling layer located between the first and second AP pinned layers; and
  each of the first and second AP pinned layers of each of the first and second AP pinned layer structures being composed of cobalt iron ($Co_{40-70}Fe_{60-30}$);

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

11. A magnetic disk drive as claimed in claim 10 wherein each of the first and second AP pinned layers of each of the first and second AP pinned layer structures is composed of $Co_{50}Fe_{50}$.

12. A magnetic disk drive as claimed in claim 11 wherein each pinning layer is composed of iridium manganese (IrMn).

13. A method of making a magnetic read head which has an air bearing surface (ABS), comprising the steps of:

a making a spin valve sensor comprising the steps of:
  forming nonmagnetic first and second spacer layers;
  forming a ferromagnetic free layer located between the first and second spacer layers;
  forming ferromagnetic first and second antiparallel (AP) pinned layer structures with the first and second spacer layers located between the first and second AP pinned layer structures;
  forming antiferromagnetic first and second pinning layers with the first and second AP pinned layer structures being located between and interfacing the first and second pinning layers respectively;
  forming the free layer being of cobalt iron nickel ($Co_{70}Fe_{15}Ni_{15}$);
  forming each of the first and second AP pinned layer structures with ferromagnetic first and second antiparallel (AP) pinned layers and an antiparallel (AP) coupling layer with the AP coupling layer located between the first and second AP pinned layers; and
  forming each of the first and second AP pinned layers of each of the first and second AP pinned layer structures of cobalt iron ($Co_{40-70}Fe_{60-30}$).

14. A method as claimed in claim 13 including:

forming nonmagnetic electrically nonconductive first and second read gap layers;

forming the spin valve sensor between the first and second read gap layers;

forming ferromagnetic first and second shield layers; and forming the first and second read gap layers between the first and second shield layers.

15. A method as claimed in claim 14 wherein each of the first and second AP pinned layers of each of the first and second AP pinned layer structures is formed of $Co_{50}Fe_{50}$.

16. A method as claimed in claim 15 wherein each pinning layer is formed of iridium manganese (IrMn).

17. A method of making a magnetic read head which has an air bearing surface (ABS), comprising:

making a spin valve sensor including the steps of:
  forming nonmagnetic first and second spacer layers;
  forming a ferromagnetic free layer between the first and second spacer layers;

forming ferromagnetic first and second antiparallel (AP) pinned layer structures with the first and second spacer layers located between the first and second AP pinned layer structures;

forming antiferromagnetic first and second pinning layers with the first and second AP pinned layer structures located between and interfacing the first and second pinning layers respectively;

each of the first and second AP pinned layer structures being formed with ferromagnetic first and second antiparallel (AP) pinned layers and an antiparallel (AP) coupling layer with the AP coupling layer located between the first and second AP pinned layers; and each of the first and second AP pinned layers of each of the first and second AP pinned layer structures being formed of cobalt iron ($Co_{40-70}Fe_{60-30}$).

18. A method as claimed in claim 17 wherein each of the first and second AP pinned layers of each of the first and second AP pinned layer structures is formed of $Co_{50}Fe_{50}$.

19. A method of making magnetic head assembly that has an air bearing surface (ABS), comprising the steps of:

making a write head including the steps of:
forming ferromagnetic first and second pole piece layers in pole tip, yoke and back gap regions wherein the yoke region is located between the pole tip and back gap regions;

forming a nonmagnetic electrically nonconductive write gap layer between the first and second pole piece layers in the pole tip region;

forming an insulation stack with at least one coil layer embedded therein between the first and second pole piece layers in the yoke region; and connecting the first and pole piece layers at said back gap region; and making a read head including the steps of:
forming nonmagnetic electrically nonconductive first and second read gap layers;

forming a spin valve sensor between the first and second read gap layers;

forming the first and second read gap layers between the first shield layer and the first pole piece layer; and a making of the spin valve sensor comprising the steps of:
forming nonmagnetic first and second spacer layers;

forming a ferromagnetic free layer located between the first and second spacer layers;

forming ferromagnetic first and second antiparallel (AP) pinned layer structures with the first and second spacer layers located between the first and second AP pinned layer structures;

forming antiferromagnetic first and second pinning layers with the first and second AP pinned layer structures being located between and interfacing the first and second pinning layers respectively;

forming the free layer being of cobalt iron nickel ($Co_{70}Fe_{15}Ni_{15}$);

forming each of the first and second AP pinned layer structures with ferromagnetic first and second antiparallel (AP) pinned layers and an antiparallel (AP) coupling layer with the AP coupling layer located between the first and second AP pinned layers; and forming each of the first and second AP pinned layers of each of the first and second AP pinned layer structures of cobalt iron ($Co_{40-70}Fe_{60-30}$).

20. A method as claimed in claim 19 wherein each of the first and second AP pinned layers of each of the first and second AP pinned layer structures is formed of $Co_{50}Fe_{50}$.

21. A method as claimed in claim 20 wherein each pinning layer is formed of iridium manganese (IrMn).

* * * * *